(12) United States Patent
Lederer

(10) Patent No.: US 8,260,869 B2
(45) Date of Patent: Sep. 4, 2012

(54) DIVIDING E-MAILS BETWEEN TWO USERS WITH THE AID OF A SERVER

(75) Inventor: Thomas Lederer, Herrsching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 242 days.

(21) Appl. No.: 12/678,613

(22) PCT Filed: Aug. 29, 2008

(86) PCT No.: PCT/EP2008/061364
§ 371 (c)(1),
(2), (4) Date: Mar. 17, 2010

(87) PCT Pub. No.: WO2009/040210
PCT Pub. Date: Apr. 2, 2009

(65) Prior Publication Data
US 2010/0217813 A1    Aug. 26, 2010

(30) Foreign Application Priority Data
Sep. 20, 2007   (DE) .......................... 10 2007 044 885

(51) Int. Cl.
*G06F 15/16* (2006.01)

(52) U.S. Cl. .......................... 709/206; 709/204; 709/217

(58) Field of Classification Search .................. 709/206, 709/204, 200, 217–219, 245–246; 379/202.01, 379/201.01, 88.17, 93.21, 158, 205.01
See application file for complete search history.

(56) References Cited

U.S. PATENT DOCUMENTS

| | | | | |
|---|---|---|---|---|
| 6,298,128 B1 * | 10/2001 | Ramey et al. | ............ | 379/142.01 |
| 7,050,557 B2 * | 5/2006 | Creamer et al. | ......... | 379/205.01 |
| 7,289,485 B1 * | 10/2007 | Srinivasan | .................... | 370/351 |
| 7,295,836 B2 * | 11/2007 | Yach et al. | .................... | 455/415 |
| 7,783,028 B2 * | 8/2010 | Bantz et al. | ............. | 379/265.06 |

(Continued)

FOREIGN PATENT DOCUMENTS

DE    102004009653 A1    9/2005

(Continued)

OTHER PUBLICATIONS

International Search Report dated Dec. 12, 2008 for PCT/EP2008/061364 (Form PCT/ISA/210).

(Continued)

*Primary Examiner* — Wing Chan
*Assistant Examiner* — Ruolei Zong
(74) *Attorney, Agent, or Firm* — Buchanan Ingersoll & Rooney PC

(57) ABSTRACT

A method for operating a communication connection between a first communication terminal and a second communication terminal including a coupling to a data processing system and communication system that may implement such a method include a first computing unit interacting with said first communication terminal and displaying a first document. At least one first piece of user-identifying address information is assigned to the first document and a second piece of user-identifying address information is assigned to a second computing unit interacting with said second communication terminal. A second is displayed on said second computing unit if the first piece of user-identifying address information corresponds with said second piece of user-identifying address information.

17 Claims, 1 Drawing Sheet

U.S. PATENT DOCUMENTS

| | | | |
|---|---|---|---|
| 7,995,716 B2 * | 8/2011 | Narang et al. | 379/88.13 |
| 2003/0217108 A1 | 11/2003 | Karim | |
| 2005/0010799 A1 | 1/2005 | Kelley et al. | |
| 2005/0059439 A1 * | 3/2005 | White et al. | 455/575.1 |
| 2005/0192966 A1 | 9/2005 | Hilbert et al. | |
| 2006/0136419 A1 | 6/2006 | Brydon et al. | |
| 2007/0250583 A1 * | 10/2007 | Hardy et al. | 709/206 |

FOREIGN PATENT DOCUMENTS

| | | | |
|---|---|---|---|
| WO | 03028357 A1 | 4/2003 | |

OTHER PUBLICATIONS

Written Opinion of the International Searching Authority for PCT/EP2008/061364 (Form PCT/ISA/237).

International Preliminary Report on Patentability for PCT/EP2008/061364 (Forms PCT/IB/326, PCT/IB/373, and PCT/ISA/237).

International Preliminary Report on Patentability for PCT/EP2008/061364 (Forms PCT/IB/338, PCT/IB/373, and PCT/ISA/237) (English Translation).

* cited by examiner

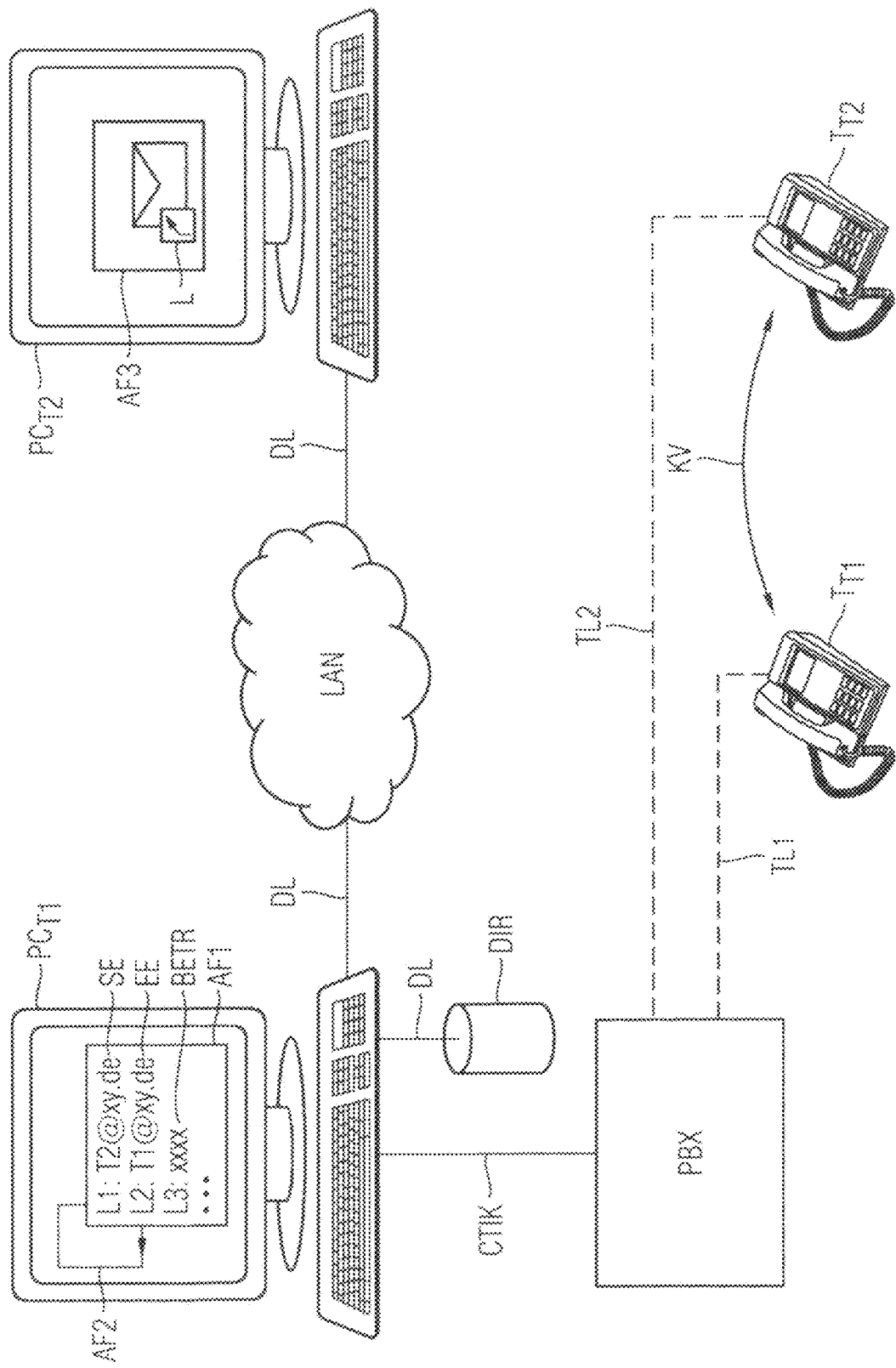

DIVIDING E-MAILS BETWEEN TWO USERS WITH THE AID OF A SERVER

CROSS-REFERENCE TO RELATED APPLICATIONS

This application is the U.S. national phase under 35 U.S.C. §371 of PCT International Application No. PCT/EP2008/061364, filed on Aug. 29, 2008, and claiming priority to German Patent Application No. 10 2007 044 885.8, filed on Sep. 20, 2007. Both of those applications are incorporated by reference herein.

BACKGROUND OF THE INVENTION

1. Field of the Invention

Embodiments of the invention relate to at least one of a method and a communication system for operating a communication connection between communication terminals.

2. Background of the Art

During an office workday it often occurs that, after an exchange of e-mail messages, a related telephone call is made. In the case of such telephone calls, often the person who has initiated the telephone call—hereinafter designated as the first user—has opened the latest related e-mail sent to his computer, so that he can read the e-mail's content during the telephone call and can refer verbally to this e-mail.

If the first user is referring to an e-mail he has received, because he wishes to discuss a portion of the e-mail, then his communication partner—hereinafter designated as the second user—often wishes that he could also see the e-mail, in order to better be able to discuss its content.

The second user can now ask the first user, during the telephone conversation, to forward the e-mail that the first user has received to an e-mail address for the second user.

If the second user was also included in the exchange of e-mail messages, as an author and/or recipient, then he can now search in his e-mail inbox or e-mail archives for the same e-mail. However, depending on the structure and organization of the e-mail inbox or archives, this can be difficult, inconvenient, and/or time-consuming.

It would be helpful for the second user to have access to a document—for example, a previously received e-mail—without long delays.

BRIEF SUMMARY OF THE INVENTION

According to one embodiment of the invented method for operating a communication connection between a communication terminal and at least one second communication terminal, wherein a connection to a data processing system is also provided, for at least one first document opened on a first computing unit interacting with the first communication terminal, at least one first piece of address information assigned to the first document and identifying a user is determined. In addition, when operating the communication connection between the first communication terminal and a second communication terminal, the at least one first piece of information is checked for correspondence with a second piece of address information assigned to a second computing unit interacting with the second communication terminal. If the first address information and the second address information correspond, at least one second document to which the document information is also assigned is located in a document memory of the second computing unit.

Embodiments of the invention may advantageously make a second user able to gain access to a document that has the same document information as the first document from the first user. Preferably, the first and second documents are copies of the same document. In this way, the second user is able to gain access to a document whose content, at least, is identical to that of the first document.

After the document is located, related actions can be performed; for example, the second user can open the second document to read it, or the second document can manually or automatically be further processed in any other way desired.

Preferably, the first document and also the second document are in the form of an electronic message such as an e-mail, any document stored in the first computing unit, or a website shown in a web browser. In such cases, the document information identifying the first document is preferably related to the particular document type. For example, in an e-mail it is part of the so-called e-mail header—the preamble to an e-mail with information such as sender, recipient, send time and date, addresses of servers involved in transmitting the e-mail—or an individual ID (identification number) in a mailbox of an e-mail program. For any document in the file system of the first computing unit, the document information is preferably the file name of the document and/or any attribute of the file, such as the date it was created. For a website as the first document, the identifying document information can preferably also be a URL (uniform resource locator).

The first or second computing unit would usually be work station computers in offices, or at least computing units capable of displaying the first and/or second documents. The first address information would preferably be an e-mail address contained in or assigned to the first document, which would preferably also be indicated by the first user in a transmission. As an alternative, it could also be a telephone number, IP address (IP: internet protocol), or MAC address (MAC: media access control) assigned by the second computing unit or the second communication terminal.

The communication connection between the first and second communication terminals is preferably a connection operating in real time, in particular a spoken communication connection such as a telephone connection. In this case, the first and second communication terminals are specifically speaking devices such as standard business land-line or cordless telephones or wireless mobile telephones. However, they can also be "soft client" devices connected to a workplace computer, which can also be used for spoken communication. Another alternative is a real-time multimedia connection between the two communication terminals.

The invention is advantageous for a communication connection operated through a communication medium other than an existing connection between the first and second computing units. Therefore, the method is especially preferred if the first communication terminal and the first computing unit are two separate devices that would normally not be connected directly to each other or have access to a shared memory. The method is also especially advantageous in scenarios where the communication connection does not permit a copy of the first document to be transmitted through the communication connection.

Operation of a communication connection can preferably be understood to include a communication connection system or communication connection that is in call mode or is continuously connected. In protocols, this type of arrangement is often designated as SETUP, ALERT, CONNECT. In addition, a communication connection rejected because the second communication terminal is busy can still be considered as an operating communication connection.

The invention-related document memory is specifically an e-mail mailbox or an e-mail archive that is connected to or can be accessed by the second computing unit. The document memory can also consist of a file system or browser interim memory, often designated as a cache.

BRIEF DESCRIPTION OF THE FIGURE

FIG. 1 is a schematic representation of a data processing system according to an embodiment of the invention.

DETAILED DESCRIPTION OF THE INVENTION

In one preferred embodiment of the method, an e-mail exchange according to the invented method may have taken place between the first user and the second user at an earlier point in time. The first user then initiates a related communication connection by calling the second user at a second communication terminal. After the communication connection is established, the first user informs the second user that he is going to refer to the content of an already transmitted e-mail during the following telephone conversation. The e-mail is then opened in a Sent window on the first computing unit. The method now allows for the first address information, which is contained in the first document of the e-mail exchange and identifies the second user, to be located in that open window, wherein one of the send and forward addresses from the e-mail exchange is recognized as the e-mail address of the second user. In addition, a clear designation is determined for the e-mail, such as the e-mail's subject line and a time stamp. Using the method, it is now determined whether either the sender or receiver address is an e-mail address for the second user. If so, the document information identifying the first document is transmitted through the communication connection or through a data connection operated parallel to it to the first computing unit, which searches in its existing e-mail mailbox for an e-mail with the same document information as the first document has. In other words, it searches for an e-mail with the same subject line and the same time stamp as was previously determined. If it finds a match, the second document located on the second user's system can now be displayed on the second computing unit. If it does not find a match, a link—i.e., an access enabler in the form of a so-called hard link or virtual link—can simply be generated to the second document in the document memory, so that the second user can access the link and through it the assigned second document by selecting the second document, by clicking with a mouse on the operating interface of the second computing unit, for example. In this way it is possible for the second user to display, on the second computing unit that is assigned to and operated by him, an e-mail with the same content as the e-mail displayed on the first computing unit.

The process explained here is only one of many conceivable processes. Additional embodiments and modifications are possible, and some are described as examples below.

In one preferred further development of the invention, the communication connection can include conferencing among multiple communication terminals. In this case, as an additional advantage, an e-mail distributor of an e-mail can be analyzed as the first document, and for each user in the e-mail exchange it can be determined whether the searched-for user is included in the conference currently taking place. If so, the located document information can be sent from his location and the document information can be checked on the related computing unit. This makes it possible for multiple users on a conference connection who have previously exchanged e-mails to receive and display the content of the e-mail displayed on the first computing unit on their individual computing units.

The opened document is assumed to be a document that is visible on a computer screen. It can also preferentially be a document that is placed in the foreground of multiple open windows. Alternatively or additionally, there can be determination as to which of the various windows on a multi-window screen is the main focus, and whether it can be used as the active open document for the purposes of the invented method. Furthermore, on a multi-process operating system, in which multiple applications may be running simultaneously on the first computing unit, there can be automatic limitation to certain configured application types that may be used to work with the open document: limitation to the e-mail program, for example. Because normally one user is only using one e-mail program at any given time, the content of an input window in that e-mail program can be displayed as the active open document. The message selected in the main window, and possibly a preview window, of the e-mail program can then preferably be used as the open document for subsequent use of the method.

The address information and/or document information can be located regardless of whether there is a communication connection at that point in time. If this is done when the first and second communication terminals are inactive, it has the advantage that the located information, such as address information and/or document information, is already available when the voice communication connection is initiated. The first and second address information can then be compared, preferably at each stage of a connection arrangement or an established connection in the communication connection. The address information can then preferably be compared in such a way that a query is made to a so-called directory service by the e-mail exchange for the e-mail addresses from the e-mail exchange. In addition, similar access to the directory service can be allowed for the communication connection, and especially for the telephone number of the second communication terminal of the second user, so that it is possible to determine whether the e-mail address of the document and the telephone number of the second communication terminal correspond to the same user: the second user. In this case, the directory service would be of a type such that a data set exists for each user and contains at least one telephone number and one e-mail address for the user. This would allow recognition of whether the same data set needs to be accessed for both queries. If so, the e-mail exchange and the communication connection involve the same communication partner of the first user, so that additional steps of the invented method can be further performed.

Document information can be transmitted through an existing connection path. Preferably, this can involve signaling or a signaling connection for the communication connection. This can be, for example, a B-channel in an ISDN connection (ISDN: integrated services digital network) or a corresponding signaling packet in a voice communication connection through H.323 or SIP (Session Initiation Protocol), according to the provisions of the ITU-T or IETF (ITU-T: telecommunications standardization sector of the International Telecommunications Union; IETF: Internet Engineering Task Force). Alternatively, transmission can also be through a data connection between the first computing unit and the second computing unit, using existing data protocols. A real-time request is not necessary for transmission of document information, but it can be advantageous for the document information to be transmitted at least fairly currently, so that the second user gains access to the second document promptly.

One preferred embodiment of the method can involve an e-mail attachment in addition to an e-mail for the first document. An e-mail attachment is defined as a separate document existing within an e-mail. An e-mail distributor of the e-mail containing the attachment can then be further analyzed as address information. To locate the document information, on the other hand, preferably a combination of information assigned to the e-mail and information assigned to the embedded attachment can be analyzed. In this way it can preferably be achieved that, as soon as the first user has opened an e-mail including an attachment, it is possible for the second user to view the attachment directly.

Additional preferred ways to use the method and further embodiments are shown in FIG. 1 and described below with reference to FIG. 1.

FIG. 1 is a schematic representation of a data processing system, consisting of a first workstation computer $PC_{T1}$, a second workstation computer $PC_{T2}$ as the computing unit according to the invention, and a local network LAN. It also shows a communication system that includes one transmission device PBX and two telephone terminals—a first telephone terminal $T_{T1}$ and a second telephone terminal $T_{T2}$—as examples of communication terminals according to an embodiment of the invention. The communication system in this case is configured for voice transmission.

In addition, between the communication system and the data processing system, there is a coupling, represented by the example of a CTI coupling CTIK between the transmission device PBX and the first workstation computer $PC_{T1}$. FIG. 1 also shows a directory service DIR with a connection to the first workstation computer $PC_{T1}$. The coupling between the directory service and the first workstation computer $PC_{T1}$, and the connection possibility between the first workstation computer $PC_{T1}$ through the local network LAN to the second workstation computer $PC_{T2}$, are represented by data lines DL shown as solid lines. The CTI coupling CTIK, which also represents a data connection, is also shown as a solid line. The couplings between the first telephone terminal $T_{T1}$ and the transmission device PBX, and between the second telephone terminal $T_{T2}$ and the same transmission device PBX, are shown as dashed lines and, unlike the data lines DL, represent a connection based on voice communication protocols.

A communication connection KV, existing or to be established, is shown in FIG. 1 by a double arrow between the two telephone terminals $T_{T1}$ and $T_{T2}$.

It is assumed that the telephone terminal $T_{T1}$ and the first workstation computer $PC_{T1}$ are assigned to the work area of a first user T1, so that he can operate both terminals. The same is true for the telephone terminal $T_{T2}$ and the second workplace computer $PC_{T2}$ with respect to the second user T2.

The starting situation for the examples that now follow is for both telephone terminals $T_{T1}$ and $T_{T2}$ to be inactive. Therefore, there is no communication connection KV at the beginning of the process described below. It is assumed that an e-mail exchange between the two users T1 and T2 has already taken place at an earlier time. Based on this e-mail exchange, it is assumed that an e-mail application is open on the first workstation computer $PC_{T1}$, in whose input window AF1 an e-mail is displayed.

In addition to the actual content of the e-mail there would also be a sending e-mail address SE, a receiving e-mail address EE, and an e-mail subject line BETR displayed in the input window AF1. The sending e-mail address SE is shown in FIG. 1 as the example of T2@xy.de, representing a valid e-mail address for the second user T2. The receiving e-mail address EE is shown as T1@xy.de, representing a valid e-mail address for the first user T1. The subject line BETR is shown in FIG. 1 simply by the characters XXXX. The e-mail content is indicated simply by dots. Additional header in the e-mail window is indicated by L1, L2, and L3.

Another input window AF2 is shown on the screen of the workstation computer $PC_{T1}$, wherein the first input window AF1 should be in the foreground with respect to the second input window AF2. This is represented in FIG. 1 by overlapping the input windows AF1 and AF2, so that the input window AF1 at least partially covers the second input window AF2.

FIG. 1 also shows an input window AF3 on the screen of the second workstation computer $PC_{T2}$, which contains a link L as reference or connection to an e-mail. These two elements of FIG. 1 will be described in more detail further below.

The starting situation is that user T1 has received an e-mail from user T2, and wishes to have a telephone conversation with user T2 regarding it. He therefore activates his telephone terminal $T_{T1}$ and selects the telephone number of the telephone terminal $T_{T2}$ assigned to the second user. The first workstation computer $PC_{T1}$ is made aware of this process by the transmission device PBX through the CTI coupling CTIK. One parameter of the resulting transmission to the first workstation computer $PC_{T1}$ is the selected telephone number of the second telephone terminal $T_{T2}$. This parameter is sent to a resident program running on the first workstation computer $PC_{T1}$. This program, by accessing the directory service DIR, now locates a data set containing all user-specific data for the telephone number provided. In particular, the e-mail address assigned to the user is extracted from the user data set. With this extracted e-mail address, a search for sender lists and recipient lists runs in the active window on the workstation computer $PC_{T1}$, i.e., in the input window AF1 with the open e-mail, to see whether there is a match with the same e-mail address located in the directory service.

In the preceding example of the invention, it is assumed that the e-mail address corresponds to the sending e-mail address SE in the input window AF1. It would then follow that the telephone unit found in the system is part of a terminal that is assigned to the same user who sent the e-mail to the first user T1. From the information in the displayed e-mail, the resident program then extracts document-specific document information—a combination of the subject line and the send date of the e-mail, for example, and possibly additional information assigned to the e-mail—and uses it to obtain document-specific access to the e-mails in an e-mail mailbox. To do this, the document-specific document information located is at least temporarily stored and processed by the resident program.

If the second user T2 now accepts the initiated communication connection KV using the second telephone terminal $T_{T2}$ and therefore changes the calling telephone connection to conversation status, then the document information can be transmitted to the second workstation computer $PC_{T2}$, and thereby in particular to a second resident program running on the second workstation computer $PC_{T2}$, by means of signaling through the communication connection KV or through a parallel data connection between the two workstation computers $PC_{T1}$ and $PC_{T2}$.

After receiving the document information, the second resident program can search in its e-mail mailbox to see whether it finds a document matching the document information. This should in principle result in a match, unless the second user has already deleted the corresponding e-mail from the previous e-mail exchange from his computer. If the second resident program finds an e-mail with the same document information in its e-mail mailbox, then a third input window AF3 can be opened on the second workstation computer $PC_{T2}$, in which link L, which gives access to the located document, is displayed as a graphic or text. This makes it possible for the second user T2, in parallel to the existing communication connection KV between the telephone terminals $T_{T1}$ and $T_{T2}$, to open the same e-mail as the first user T1 already has open on his screen by simply clicking on the displayed link.

The method therefore allows the second user T2 to quickly and easily gain access to the same document that the first user T1 is displaying and that the first user T1 is currently processing or viewing. No lengthy manual search in a document list is necessary, and this is even more advantageous because the search function in existing e-mail systems is often not very efficient.

Multiple variations of this process can be conceived. For example, the located e-mail can be displayed in a separate input window AF3 as a link such that it is shown in the inbox as the newest incoming message. Alternatively, the resident program on the second workstation computer $PC_{TZ}$ can open the e-mail or the document to be displayed immediately on its screen, without using a link, as soon as it is identified in the document memory. Preferably, both e-mail mailboxes on both workstation computers $PC_{T1}$ and $PC_{T2}$ have the same type of e-mail indexing, so that an index located as document information for the first document can be used as a document-specific access key for the e-mail on the second workstation computer $PC_{T2}$, giving the second workstation computer $PC_{T2}$ faster access to the e-mail mailbox. This is possible especially if the document memory's indexing is continuously updated, so that no lengthy search in the document memory is necessary.

As an alternative to the solution shown with a directory service DIR, this type of service is not needed if the e-mail program has the type of address book or contact function in which relevant data such as e-mail addresses and telephone numbers of potential communication partners are stored. In that case, merely accessing this address book or contact list is sufficient. This condition would also be met if the company has a central company address book, in which relevant personnel data such as telephone numbers and e-mail addresses are stored.

Because it is possible that a particular user may not wish to use this function and does not want e-mail to be opened automatically on his workstation computer, the method can allow the second user to manually activate and/or deactivate this function. Using so-called black or white lists, it can also allow access to certain calling users to be blocked or unblocked.

If the document information is not document-specific, the method can still operate in such a way that, if multiple hits are found on the workstation computer $PC_{T2}$, a list of these hits is displayed and the second user can choose one entry from the list, preferably by clicking on it. As an alternative, multiple hits can also cause an automatic callback to the first workstation computer $PC_{T1}$ to get a second criterion for selecting from the list of hits, with the goal that this second criterion will allow a document-specific selection to be made.

Along with the transmitted document information, the position of a cursor or the position of markings within the first document can be sent from the first workstation computer $PC_{T1}$ to the second workstation computer $PC_{T2}$, so that the second user T2 can also display these markings or the position of the cursor. Preferably, a type of position information is sent and is analyzed at the receiving end. This allows the first user T1 to mark a relevant passage in advance, which makes it easy to find a particular section even in long documents and means that the second user T2 does not have to spend time searching in the second document.

Even if the communication connection KV is not successfully established and/or the call is not answered by the second user T2, in one embodiment of the method the document information can still be sent to the workstation computer $PC_{T2}$, using an expanded caller ID list for the transmitted document information such that, in the caller ID list along with the information for the failed call, information about the document involved is also displayed: in particular, a file name, subject line, or link to the document. In this way, when the second user T2 looks at the caller ID list, he will clearly see what the subject matter of the missed call was.

Preferably, in examples of the connection, all address fields in an e-mail are analyzed to locate address information, including the usual fields designated at "To," "From," "cc," and "bcc" for the sender, recipient, and other recipients to receive copies. If distribution lists are used, it may be necessary to configure the system to search first for the distributor designation in the actual list of e-mail addresses.

In one embodiment of the invention, it can be configured to locate the relevant open document automatically. In an alternative to that, it can also be configured so that the first user explicitly designates a document for which the document information is to be located.

In addition, the procedure according to the invention can be configured such that certain individual steps depend directly on the stage in the process of establishing the communication connection. For example, picking up the receiver can be used as the signal to determine which document is the active one. It can also be the trigger for having the first address information and the first document information located. After that, each additional stage in the communication connection can trigger at least one of the process steps according to the invention.

In addition to e-mail, described in the preceding example, the method can also similarly be applied to any other type of document. For example, in a software development department in which all employees have access to a central software depository, the method can be used in such a way that a first user, who has opened a certain source code and scrolled to a certain procedure or method contained in it, can call a second user and have document information designating the document and the position sent to the second user, so that the same source code can be opened for him to view as well. It is then easy to begin a discussion about the open position in the code. The document memory in this case would not be an e-mail mailbox, but rather a source code depository on a central server.

In alternative embodiments, however, the document memory can also simply be a file system on the second workstation computer $PC_{T2}$.

In further alternative embodiments, the sequence in time of individual method steps can easily be varied. For example, it is not necessary to wait until a communication connection KV is established, but rather is possible for the workstation computer $PC_{T1}$ to complete several of the possible steps, such as locating document information, while the telephone terminal $T_{T1}$ is still inactive.

The document information is transmitted preferable in a new or optional signaling element of a signaling connection of the communication connection KV, or goes through a direct or server-operated data connection between the workstation computers $PC_{T1}$ and $PC_{T2}$. For a data connection, an existing protocol can be used for this type of transmission. However, for a data connection, transmission by signaling the communication connection KV has the advantage that security devices existing in a network, such as firewalls or a proxy server that affects data traffic, will have no negative influence, while theoretical configurations are possible in the data network that could cause transmission from the first workstation computer $PC_{T1}$ to the second workstation computer $PC_{T2}$ to be blocked. When using a data connection, it can also be necessary to implement a corresponding network configuration so that a data connection can successfully transmit the document information.

While it has heretofore been assumed that a second document can be located for the transmitted document information, it can occur that the second user has already deleted the corresponding document. If the document is still in the trash on the second workstation computer $PC_{T2}$, it is possible for the second user to access the document found in the trash. However, if no document can be found for which the second document information matches the first document information, the method can be configured so that the second user sees a message on the screen of the second workstation computer with notification that the process has quit with unsuccessful results.

The method was described with the assumption of a transmission between two users in which the two users are located within a company and are employees with connections to a transmission device PBX. This is only an example, however: any other types of communication structure and communication process are conceivable and can be used with the invented method.

The invention claimed is:

1. A method for operating a communication connection between a first communication terminal and a second communication terminal comprising:
   a first computing unit displaying a first document;
   the first communication terminal attempting to form the communication connection with the second communication terminal, the first computing unit associated with a first user and the first communication terminal associated with the first user, the first communication terminal attempting to form the communication connection with the second communication terminal occuring while the first document is displayed by the first computing unit;
   a first transmission device informing the first computing unit of the attempt to form the communication connection and sending at least one first parameter related to the communication connection to the first computing unit, the at least one first parameter comprising at least one of an address of the second communication terminal and an address associated with a second user of the second communication terminal, the first transmission device being of a communication system that also comprises the first communication terminal and the second communication terminal;
   the first computing unit extracting document information for the first document in response to receiving the at least one first parameter from the first transmission device;
   the second communication terminal establishing the communication connection with the first communication terminal;
   the first computing unit sending the document information to a second computing unit after the communication connection is established, the second communication terminal associated with the second user and the second computing unit associated with the second user;
   in response to receipt of the document information, the second computing unit searching for a copy of the first document; and
   the second computing unit displaying at least one of a link to the copy of the first document and the copy of the first document; and
   wherein actuation of the link to the copy of the first document causes the second computing unit to display the copy of the first document.

2. The method of claim 1 further comprising defining the document information from the first computing unit by the second computing unit to be document-specific for all documents in a document memory on the second computing unit.

3. The method of claim 1 wherein the first computing unit is a computer, the first communication terminal is a telephone, the second communication terminal is a telephone and the second computing unit is a computer.

4. The method of claim 1 further comprising the first computing unit conducting an analysis for the extracting of the document information at a time selected from the group consisting of:
   when the communication connection makes a call,
   when the communication connection is established,
   when the communication connection is answered by the second communication terminal,
   when the communication connection goes through after being accepted by the second communication terminal, and
   when the communication connection goes through after being accepted by the second computing unit.

5. The method of claim 1 further comprising the first computing unit locating the document information when a document window is opened.

6. The method of claim 1 further comprising the first computing unit locating and analyzing document information in a same process.

7. The method of claim 1 further comprising the first computing unit storing located document information until analysis of the document information and extraction of the document information is completed.

8. The method of claim 1 further comprising including in the communication connection a signaling connection between the first communication terminal and the second communication terminal and transmitting the document information through the signaling connection.

9. The method of claim 1 further comprising including a data connection between the first computing unit and the second computing unit, and transmitting the document information through the data connection.

10. The method of claim 1 wherein the second computing unit displays the copy of the first document.

11. The method of claim 1 wherein the second computing unit displays a link to the copy of the first document.

12. The method of claim 1, wherein the first document is selected from the group consisting of an electronic message and an attachment to an electronic message.

13. The method of claim 1 wherein the first computing unit extracts the document information from documents stored in document memory, the document memory being selected from the group consisting of an e-mail mailbox and an e-mail archive.

14. The method of claim 1 wherein the document information is located for extraction by use of a first program stored and executed on the first computing unit.

15. The method of claim 1 wherein the searching for the copy of the first document is performed by use of a second program stored and executed on the second computing unit.

16. A communication system comprising:
   a first communication terminal associated with a first user;
   a first computing unit associated with the first user;

a second communication terminal associated with a second user;

a second computing unit associated with the second user;

a first transmission device communicatively connected to the first communication terminal and the second communication terminal, the first transmission device, first communication terminal and second communication terminal being portions of the communication system;

the first and second computing units being portions of a data processing system;

the first computing unit displaying a first document;

the first communication terminal attempting to form the communication connection with the second communication terminal while the first document is displayed by the first computing unit;

the first transmission device informing the first computing unit of the attempt to form the communication connection and sending at least one first parameter related to the communication connection to the first computing unit, the at least one first parameter comprising at least one of an address of the second communication terminal and an address associated with the second user;

the first computing unit extracting document information for the first document in response to receiving the at least one first parameter from the first transmission device;

the second communication terminal establishing the communication connection with the first communication terminal;

the first computing unit sending the document information to the second computing unit after the communication connection is established;

in response to receipt of the document information, the second computing unit searching for a copy of the first document; and the second computing unit displaying at least one of a link to the copy of the first document and the copy of the first document; and wherein actuation of the link to the copy of the first document causes the second computing unit to display the copy of the first document.

17. The system of claim 16 wherein the first computing unit is a computer, the first communication terminal is a telephone, the second communication terminal is a telephone and the second computing unit is a computer.

* * * * *